United States Patent [19]

Raupach

[11] Patent Number: 5,415,270
[45] Date of Patent: May 16, 1995

[54] TRANSPORTING DEVICE FOR MASS ARTICLES

[75] Inventor: Dietmar Raupach, Oerlinghausen, Germany

[73] Assignee: Selas S.A., Gennevilliers Cedec, France

[21] Appl. No.: 237,183

[22] Filed: May 3, 1994

[30] Foreign Application Priority Data

May 3, 1993 [DE] Germany .................. 43 13 438

[51] Int. Cl.⁶ .................................. B65G 15/24
[52] U.S. Cl. .......................... 198/607; 198/801
[58] Field of Search .............. 198/604, 607, 626.1, 198/801, 688.1, 690.2

[56] References Cited

U.S. PATENT DOCUMENTS

| 4,938,649 | 7/1990 | ter Horst et al. | 198/607 X |
| 5,094,340 | 3/1992 | Avakov | 198/604 X |
| 5,113,992 | 5/1992 | Sadamori | 198/607 X |

FOREIGN PATENT DOCUMENTS

| 0100427 | 2/1984 | European Pat. Off. . |
| 3630670 | 4/1987 | Germany . |
| 4135515 | 6/1992 | Germany . |

Primary Examiner—Cheryl L. Gastineau
Attorney, Agent, or Firm—Michael J. Striker

[57] ABSTRACT

A transporting device for mass articles, in particular package covers for use in drying surfaces for drying and/or jelling of varnished or coated surface, the transporting device comprises two endless rotating transporting elements extending parallel and opposite to one another so that mass articles can be guided between the transporting elements from a supply station to a withdrawal station, the transporting elements being formed as corrugated hoses with parallel corrugations having substantially straight flanks for forming receiving grooves, and tubular and laterally open guides guide the corrugated hoses.

14 Claims, 4 Drawing Sheets

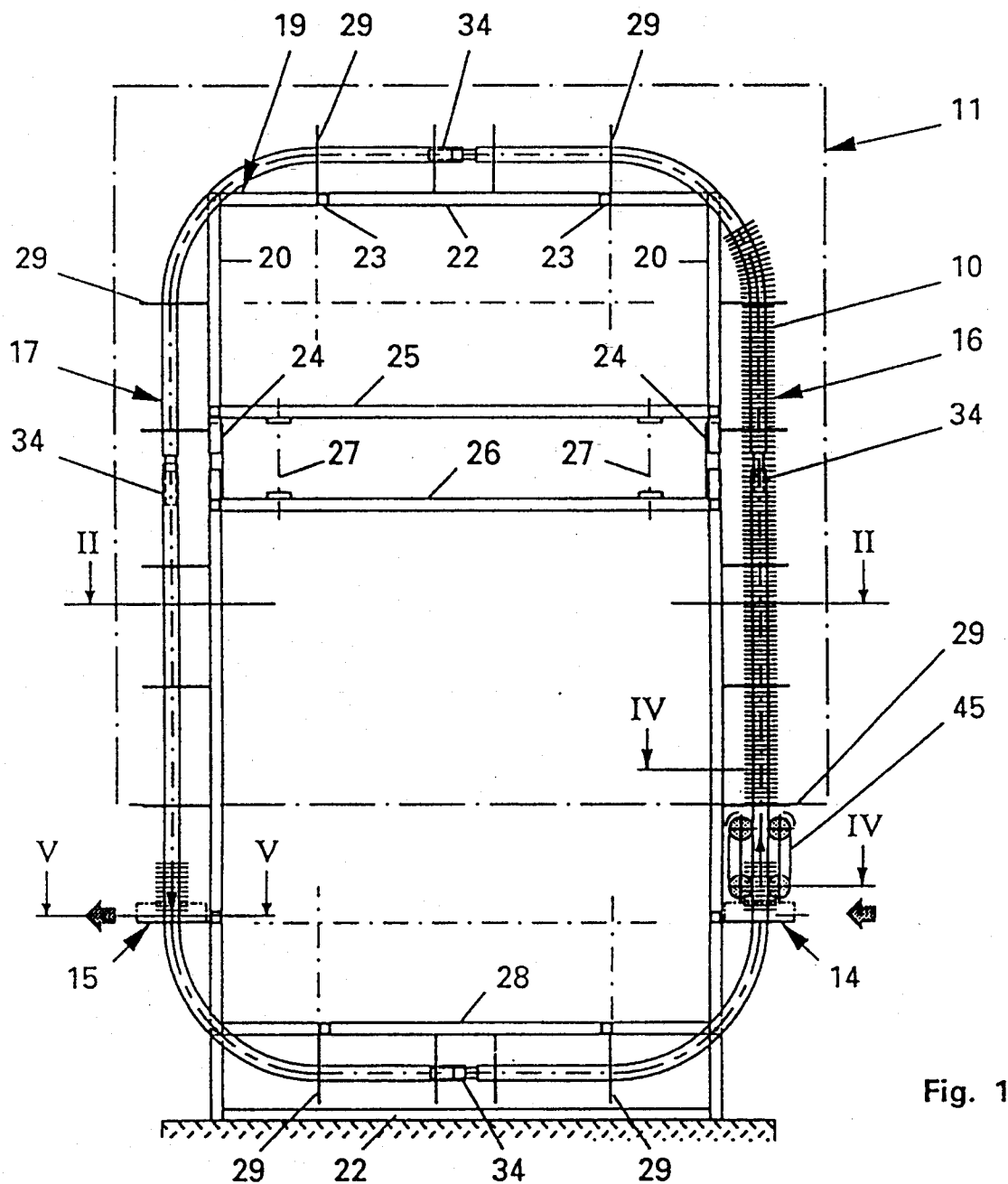
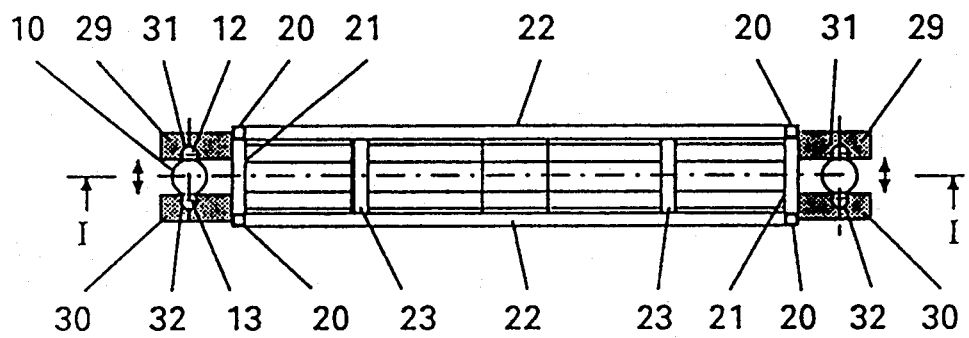
Fig. 1
Fig. 2

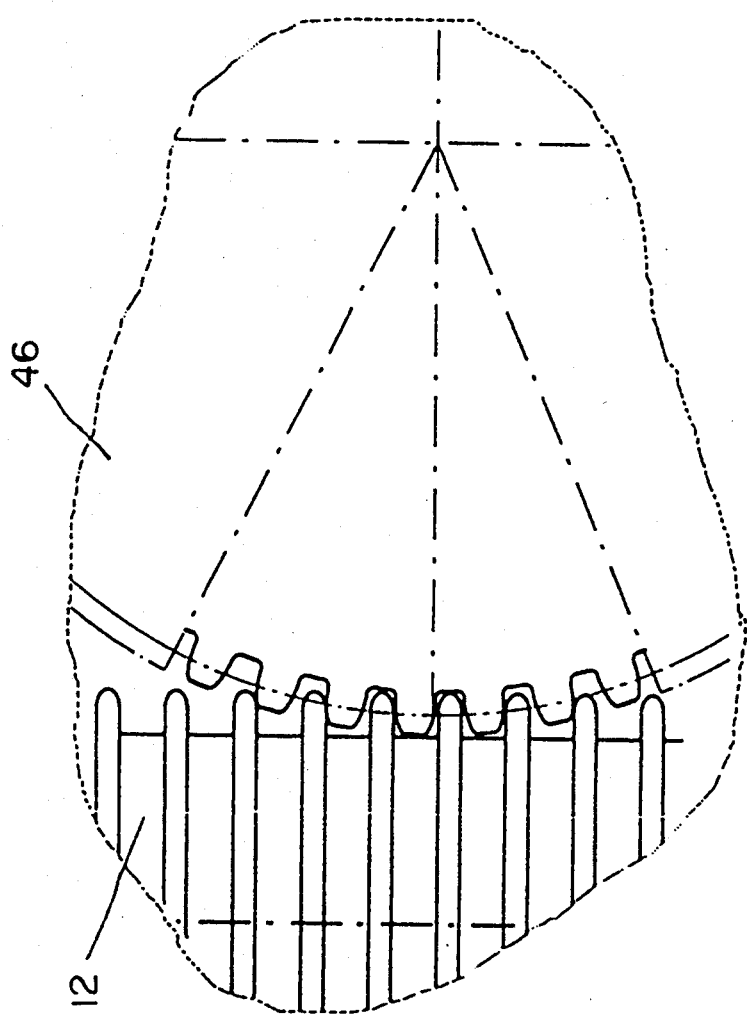

TRANSPORTING DEVICE FOR MASS ARTICLES

BACKGROUND OF THE INVENTION

The present invention relates to a transporting device for mass articles.

More particularly, it relates to a transporting device for mass articles, in particular package covers for use in drying furnaces for drying and/or jelling of varnished and/or coated surfaces.

In particular it relates to a transporting device which has two endless rotatable transporting elements extending parallel at a distance from one another, so that the mass articles are guided between them from an inlet station to an outlet station individually in receiving grooves.

A transporting device of the above mentioned general type is disclosed for example in the European patent document EP 0 100 427. In this device the transportation of the package covers is performed by transporting chains which rotate paternoster-like endless over chain wheels and are provided laterally with a plurality of receiving pockets with grooves for receiving the covers. For securing the covers in the region of the straight transporting paths a four-point guide is provided. The guide is composed of lateral receiving pockets and two 90-degree-arrangement stationary guiding rods. In the deviation region of the transporting chains, the covers are supported with an edge region on a circular-arc-shaped supporting surface. In the practice such a transporting system is prone to instability despite an additional and technically expensive transporting chain guide, and it is disadvantageous for the whole working process. During disturbances in the transporting system, such as for example cover jamming or elongation of a chain strand, the joint support of the chain wheels arranged in pairs in a transporting strand prevents the post-clamping or change of an individual chain strand. Instead both chain strands together with the receiving pockets mounted on them must be dismounted and again oriented. As a rule it results in undesirably high stoppage time as well as stoppage in transporting operations and furnace operation.

SUMMARY OF THE INVENTION

Accordingly, it is an object of the present invention to provide a transporting device for mass articles, which avoids the disadvantages of the prior art.

More particularly, it is an object of the present invention to provide a transporting device which has a simpler construction and at the same time reduced susceptibility to disturbances.

In keeping with these objects and with others which will become apparent hereinafter, one feature of the present invention resides, briefly stated, in a transporting device in which instead of a plurality of individual parts of the transporting system only two guided corrugated hoses with parallel corrugation are provided. The good shape stability and bending strength of the thusly arranged corrugated hoses solves the problems specified hereinabove. The corrugated hoses can be mounted and then clamped individually when needed. For example for receiving differently shaped mass articles, they can be replaced by another corrugated hose pair with correspondingly adjusted corrugation pitch in a fast and simple manner. Due to the continuously closed guiding paths of sliding transporting means, the transportation of mass articles can be performed both vertically and horizontally without providing additional features on the transporting paths in particular in the region of circular arc-shaped deviations for securing and supporting the mass articles. Since the transporting system operates without lubrication the inventive transporting device can be used in particular for such mass articles which handled in the beverage industry and foot stuff industry.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view Showing a longitudinal section of a transporting device in accordance with the present invention taken along the line I—I in FIG. 2;

FIG. 2 is a view showing a section taken along the line II—II in FIG. 1;

FIG. 9 is a view showing engagement of the corrugated hose with a toothed pinion of a drive.

DESCRIPTION OF THE PREFERRED EMBODIMENTS

Figure 3:
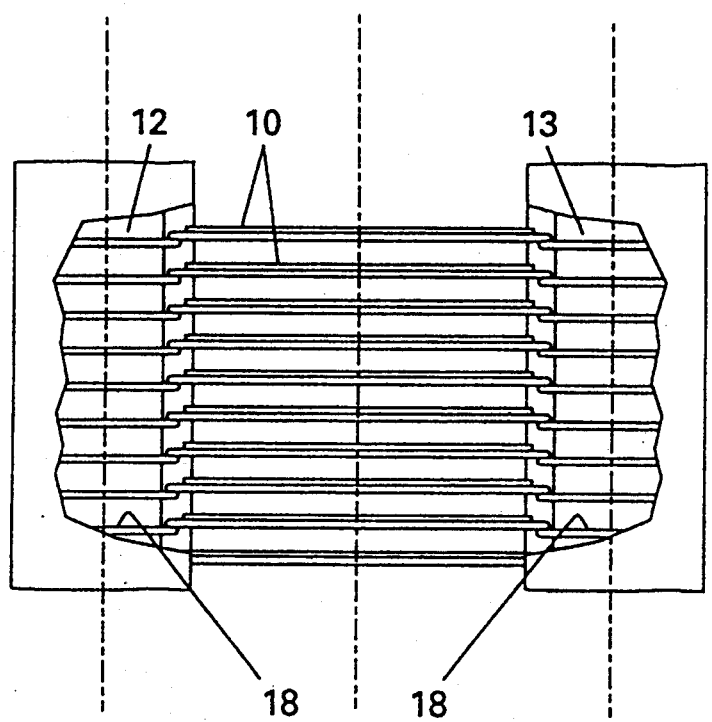
FIG. 3 is a schematic partial view of one corrugated hose pair with interposed covers.

The device in accordance with the present invention is designed for transportation of lacquered covers or covers provided with sealing masses as identified with reference numeral 10. For drying and/or jelling of the varnished and/or coated surfaces they pass through a gas or electrically heated industrial furnace 11 identified with dash-dot line and formed for example as a turret furnace. The transporting device for this purpose has two endless rotatable corrugated hoses 12 and 13 extending parallel to one another at a distance from each other. The covers 10 are transported in a column form from a supply station 14 to a discharge station 15 in a paternoster manner through at least one upwardly extending and at least one downwardly extending transporting paths 16, 17. An arc-shaped transfer is connected with the vertical transporting paths 16, 17 and merges into a horizontal path region.

As can be seen particularly from FIG. 3, the corrugated hoses 12 and 13 are corrugated substantially with straight flanks and arranged relative to one another so that the corrugation troughs of the individual covers 10 serve as receiving grooves 18. Therefore it is guaranteed that within the cover column the covers 10 are maintained under one another with a constant distance.

Figure 6:
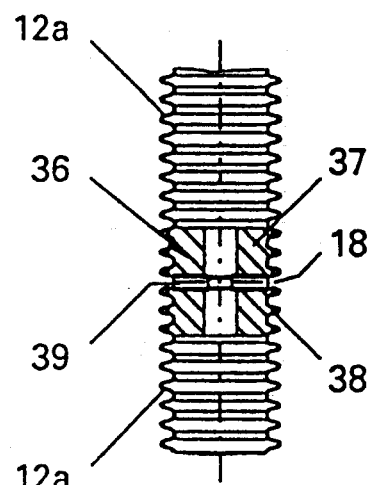
FIG. 6 is a view showing a longitudinal section through a connection of the corrugated hose of the inventive device.
Figure 7:
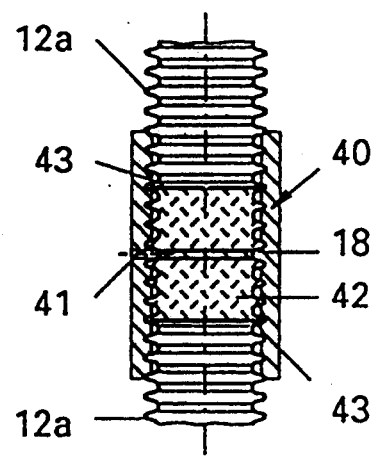
FIG. 7 is a longitudinal section through a further connection of the corrugated hose of the inventive device.

The corrugated hoses 12, 13 composed for example of high grade steel or Teflon are assembled from individual corrugated hose pieces which are connected with one another as shown in FIGS. 6 and 7 to an endless transporting element.

In a basic structure of FIGS. 1 and 2 the transporting paths are formed with the aid of a stable frame 19 which is firmly connected with a foundation. It has four vertical supports 20 which are connected with one another by lateral transverse and longitudinal carriers 21 and 22. The longitudinal carriers 22 are additionally reinforced in the top and bottom region by a further transverse carrier 23. The supports 20 in their upper third are subdivided into two parts and connected with one another by a displacement seat 24. Additional intermediate carriers 25, 26 are provided below and above the displacement seat 24. They engage inwardly on the supports 20 and are connected with one another by four threaded rods 27. Two further intermediate carriers 28 are provided near the bottom in the lower region of the frame. By means of the displacement seat 24 the frame 19 can be adjusted as to its height, so that in this manner, the clamping of both corrugated hoses 12, 13 guided on the frame can be provided. The height adjustment of the supports 20 is performed by the threaded rod 27. Instead, springy elements can be utilized for this purpose.

A row of holding plates 29, 30 are provided at both sides of the support 20 as well as on the upper longitudinal carriers 22 at certain distances. They extend in pairs in a plane which is perpendicular to the outer surface of the frame outwardly and are mounted in the plane displaceably on the frame. Correspondingly oriented and displaceable holding plates 29, 30 are arranged near the bottom of the frame on both intermediate carriers 28. Each holding plate 29, 30 has a circular recess 31, 20 at the same distance to the adjacent frame and opposite to one another. It is limited by the inner plate edge in a segment-like manner. With identical distances between two holding plates 29, 30 arranged in a plane, their recesses 31, 32 are axially oriented with the respective recesses of the subsequent holding plates and thereby form a solid line surrounding the frame at the constant distance.

Figure 4:
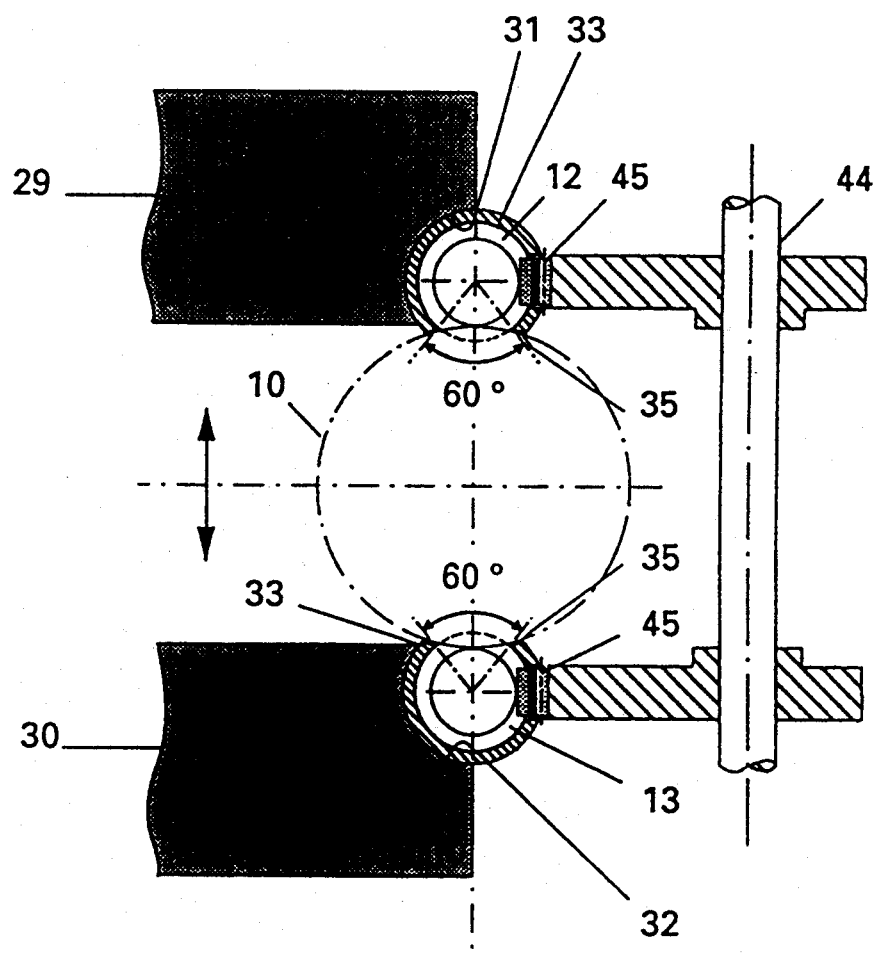
FIG. 4 is a section view taken along the line IV—IV in FIG. 1, on an enlarged scale.
Figure 5:
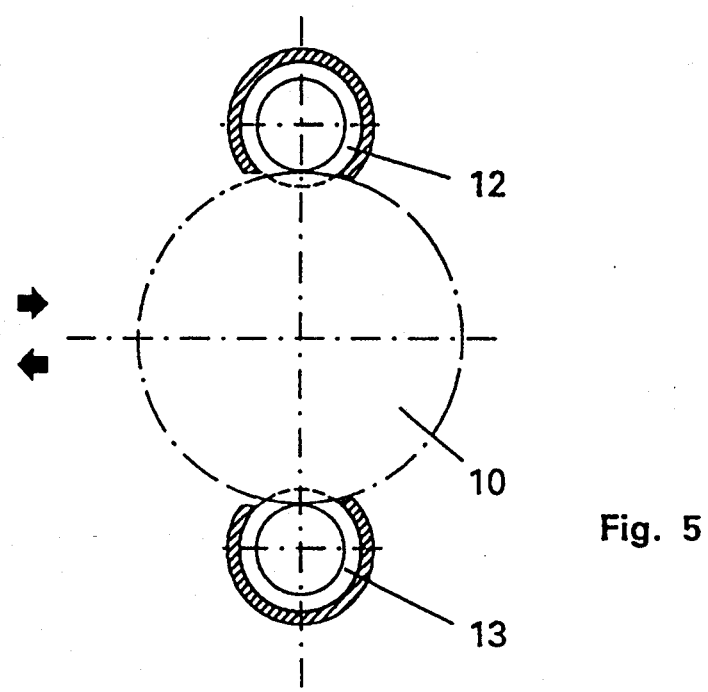
FIG. 5 is a section view taken along the line V—V in FIG. 1 on an enlarged scale.

As can be seen from FIG. 4 in the recesses 31, 32 of one row of the holding plates 29, 30 a pipe 33 which serves as a guide is adjusted to the endless rotating corrugated hose 12, 13. The pipe 33 which can be composed of the same or similar material as the corrugated hose is composed of several pipe pieces assembled by displacement seat connections 34 to form a closed system. The displacement seat connections 34 are provided for thermal reasons and arranged preferably so that at least one connecting location is arranged in one straight transporting path region. The pipe 33 is provided in an opening region of the recess 31, 32 with a longitudinal slot 35 whose free opening cross-section corresponds to an arc of preferably 60 degree. The corrugated hose 12, 13 which slidingly engages in the pipe 33 extends in the opening region of the longitudinal slots 32 with its corrugated surface outwardly beyond the inner edge of the holding plates 29, 30. Therefore the cover 10 can be supported with an edge region on the oppositely located corrugated hose 12, 13. The opening cross-section of the longitudinal slot 35 is dimensioned so that the movement play of the cover 10 inside the supporting region is limited. The longitudinal slots 35 are expanded at the inlet side and at the outlet side at the height of the supply and discharge stations 14, 15 for guiding the cover in and out as can be seen from FIG. 5.

FIGS. 6 and 7 show two possibilities for connecting individual corrugated hose pieces to form an endless transporting element. In both cases the oriented hose ends 12a are joined to one another at a distance which corresponds to a corrugation trough or the width of one receiving groove 18. In the embodiment shown in FIG. 6 the connection is performed by a clamping device 36 composed of two semi-shell-shaped elements 37, 38. Their arc-shaped outer profile corresponds to the inner profile of the corrugated hoses 12, 13. Both elements 37, 38 are connected form-lockingly with one another for example by a threaded pin 39. In the corrugated hose connection of FIG. 7 the hose ends 12a are oriented by means of an outwardly abutting fitting member 40 with an injection opening 41 and the inner space of the pipe ends is foamed with a hardenable material 42. Then it is sealed by the lateral partitions 43.

As can be seen in particular from the section shown in FIG. 4, both corrugated hoses 12, 13 are driven through a shaft 44 and preferably by a double-toothed toothed belt 45 synchronously with the speed which is determined by the supply speed of the supply station 14 and the withdrawal speed of the withdrawal station 15. For the drive which preferably is performed outside of the drying furnace 11 in FIG. 1, the pipe 33 is cut out in a 90-degree arrangement to the cover column so that the toothed rim 45 can engage directly into the corrugated hose 12, 13. A light barrier arrangement is preferably used as a signal transducer for a possible cycle movement control of the corrugated hoses 12, 13.

Within the spirit of the invention it is possible to orient several upwardly and downwardly running transporting paths one behind the other or to orient all transporting paths horizontally. In the latter case mass articles with different designs can be transported without expenditures for changes by providing suitable carrier elements in the receptacle grooves for the upwardly open corrugated hose guide for example to suspend the mass articles on them.

Figure 8:
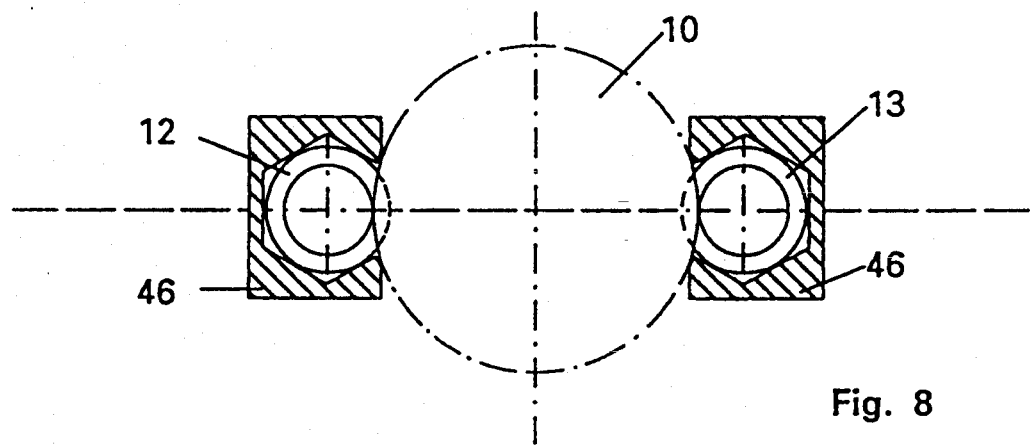
FIG. 8 is a view showing a section through another embodiment of a guide for the corrugated hose with a hexagonal inner profile.

FIG. 8 shows that it is advisable to form the recesses in the holding plates as a throughgoing massive guide 46 which directly received the corrugated hose 12, 13 without interposition of a pipe and its inner profile is formed hexagonal. The shape of the inner profile can be of any type and can be different as to the course in a transporting path as long as there is a sufficient number of contact points between the corrugated hoses and the hollow bodies for a reliable corrugated hose guide. For transporting mass articles of different sizes the massive guides 46 are mounted similarly to the holding plates 29, 30 displaceably on the frame.

FIG. 9 shows a further modification of a drive for the corrugated hoses 12, 13. As can be seen from this Figure, a toothed pinion 46 rotates about its axis and the teeth of the toothed pinion engage with corrugations of the corrugated hose 12. During rotation of the toothed pinion 46, the corrugated hose 12 is displaced in a transporting direction.

It will be understood that each of the elements described above, or two or more together, may also find a useful application in other types of constructions differing from the types described above.

While the invention has been illustrated and described as embodied in a transporting device for mass articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transporting device for mass articles, comprising two tubular and laterally open guides; and two endless rotating transporting elements located at open sides of said guides and guided by said guides, said transporting elements extending parallel and opposite to one another so that mass articles can be guided between said transporting elements from a supply station to a withdrawal station, each of said transporting elements being formed as a corrugated hose with parallel corrugations having substantially straight flanks for forming receiving grooves so as to guide a mass article by said corrugated hoses.

2. A transporting device as defined in claim 1, wherein each of said guides is formed as a stationary pipe having a longitudinal slot.

3. A transporting device as defined in claim 2, wherein said longitudinal slot has a free opening cross-section with an arcuate size of 60 degree.

4. A transporting device as defined in claim 1, wherein each of said guides has a lateral opening provided in the region of the supply station and withdrawal station and expanding at an inlet side and an outlet side correspondingly.

5. A transporting device as defined in claim 1, wherein each of said corrugated hoses is composed of a heat resistant material.

6. A transporting device as defined in claim 5, wherein said heat resistant material is heat resistant high grade steel.

7. A transporting device as defined in claim 5, wherein each of said corrugated hoses is composed of heat resistant Teflon.

8. A transporting device as defined in claim 1; and further comprising a drive for said corrugated hoses including a double-toothed toothed belt.

9. A transporting device as defined in claim 1; and further comprising a drive for said corrugated hoses and including a pinion with a profile corresponding to a profile of said corrugated hoses.

10. A transporting device as defined in claim 1; and further comprising a signal transducer for a cycle movement control of said corrugated hoses.

11. A transporting device as defined in claim 10, wherein said signal transducer is formed as a light barrier.

12. A transporting device as defined in claim 1, wherein said corrugated hoses have ends connected with one another; and further comprising means for connecting said ends with one another and including a clamping device provided with two semi-shell-shaped elements abutting against an inner wall of said ends of said corrugated hoses.

13. A transporting device as defined in claim 1, wherein said corrugated hoses have ends connected with one another and foamed with a hardenable material.

14. A transporting device as defined in claim 1, wherein said guides form a transporting path; and further comprising means for changing a distance between said guides.

* * * * *